No. 799,152. PATENTED SEPT. 12, 1905.
E. A. FLETCHER-COPP.
DEVICE FOR TEACHING MUSIC.
APPLICATION FILED AUG. 19, 1904.
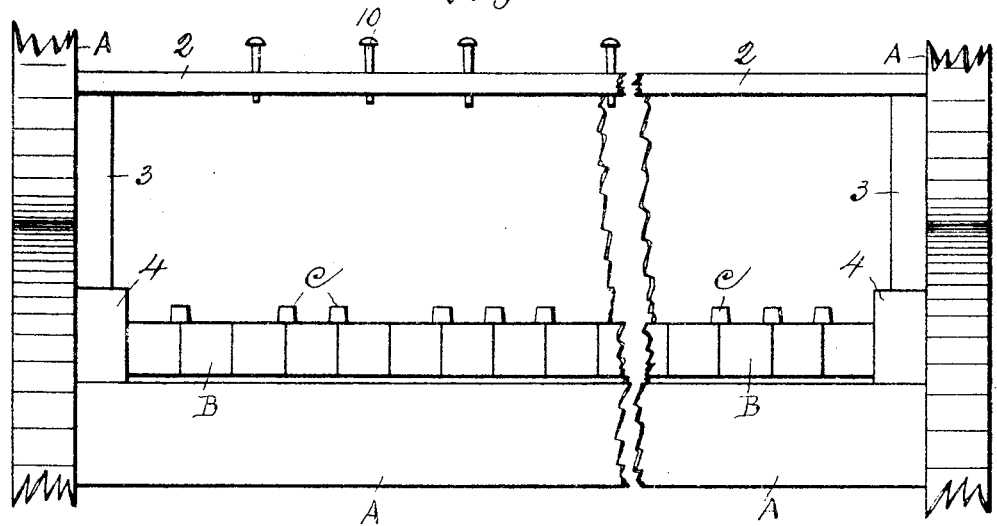
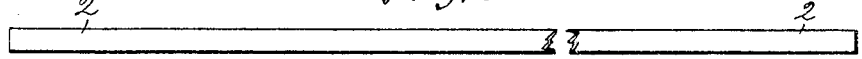
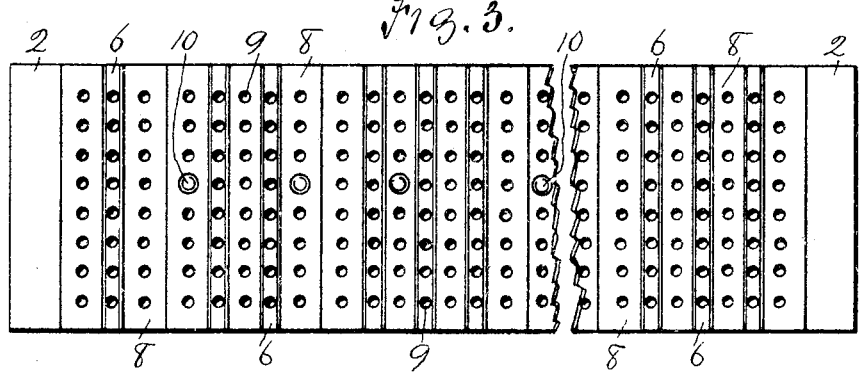

UNITED STATES PATENT OFFICE.

EVELYN ASHTON FLETCHER-COPP, OF BROOKLINE, MASSACHUSETTS.

DEVICE FOR TEACHING MUSIC.

No. 799,152.      Specification of Letters Patent.      Patented Sept. 12, 1905.

Application filed August 19, 1904. Serial No. 221,318.

*To all whom it may concern:*

Be it known that I, EVELYN ASHTON FLETCHER-COPP, a citizen of Canada, and a resident of Brookline, in the county of Norfolk, in the State of Massachusetts, have invented new and useful Improvements in Devices for Teaching Music, consisting of a modulating-board arranged over the keyboard of a piano, of which the following is a specification.

My invention relates to a device for teaching young pupils the piano; and it consists in the novel feature of the same, as will be hereinafter more fully described, and pointed out in the claim, and is delineated into black and white transverse spaces in accordance with the keyboard—that is, the three black spaces correspond to the three black keys, the two black spaces correspond to the two black keys, and the white spaces correspond to the white keys, of the piano. Each of the black and white spaces referred to contain a number of holes for the insertion of pegs of different colors to indicate certain piano-keys. The pegs are placed corresponding to the keys which must be played to produce certain chords.

The objects of my invention are, first, to provide means to aid a young pupil in knowing which keys to take to make different closing cadences; second, to provide means of impressing the different chords upon the young pupil's mind and without bringing in a different material, which is the case when the chords are placed before the child on the printed sheets of music; third, to provide means to assist the young pupil in modulating and also in improvising; fourth, to afford facilities for teaching and instructing the young mind of the pupils in such a manner that the impressions attained will be of permanent character; fifth, to provide means to enable the blind to make use of the same method; sixth, to provide means for teaching as above referred to and which may readily be placed in position on the piano and as readily removed therefrom, and, seventh, to afford facilities for playing the piano when the modulating-board is in position. I attain these objects by the device illustrated in the accompanying drawings, in which—

Figure 1 is a front elevation of a piano with the modulating-board placed thereon above the keys, both being broken and a few pegs shown in the modulating-board. Fig. 2 is a front elevation of the detached modulating-board, also shown broken; and Fig. 3 is a plan of the modulating-board as in Fig. 1 of the drawings, showing a few key-indicating pegs in the series of longitudinal and parallel rows of holes.

Similar characters refer to similar parts throughout the several views.

In the drawings the piano is indicated by A, the white keys by B, and the black keys thereof by C.

The modulating-board is indicated by 2 and is shown resting on end blocks 3, which rest on the end parts 4 of the piano. It will be noticed that there is sufficient space between the modulating-board and the piano-keys to allow performance on the piano. The modulating-board extends in length fully as far or beyond the piano-keys and may be as wide or less than the length of the white keys, as shown in Fig. 3 of the drawings, or may terminate with the length or front end of the black keys. The modulating-board may easily be made to suit various makes of pianos having more or less octaves, as the case may be, and may be constructed of suitable material, preferably of wood. The modulating-board is delineated and divisioned transversely into black and white spaces corresponding with the black keys C and the white keys B of the piano. The black spaces of the modulating-board 2 are indicated by 6 and the white spaces by 8 and extend transversely on the board 2, as shown in Fig. 3 of the drawings. It will be observed that the black spaces 6 of the modulating-board are directly over the black keys C of the piano, and the white spaces 8 of the modulating-board are directly over the white keys B of the piano and correspond with said keys. The pegs in Fig. 1 are in the same position as in Fig. 3 of the drawings. Said spaces 6 and 8 have each a number of longitudinal and parallel rows of holes 9, as shown in Fig. 3 of the drawings. Pegs or indicators 10 of different colors fit snugly into the holes 9, which are all the same size. A few of the pegs 10 are shown in various places in the holes 9 of the modulating-board. Those shown in Fig. 1 of the drawings are shown in the same spaces as shown in Fig. 3 of the drawings in order to have the two said views of the drawings to correspond with each other. The pegs as so placed in the drawings represent the triad of C-major—namely, C, E, G. The drawings show eight rows of holes 9, though more or less may be used. With eight rows of holes, as shown, eight chords may be registered—one chord on each row. The pegs 10 are intended to be of three colors, the pegs of one color to be placed in the holes opposite to or above the white keys and the pegs of two other colors to be placed in the holes opposite to or above the black keys of the piano, one color representing sharps and the other flats. The pegs fit snugly and firmly in the holes and may be flush with the under side of the board 2 or they may protrude through the board, as the case may be. The front of the modulating-board may be stationed somewhat inward from the front of the piano-keyboard or may be in vertical line therewith; but the spaces referred to on the modulating-board should be opposite to the piano-keys. Again, the modulating-board may be placed over the keyboard in an inclined position, if desired—that is, the front edge of the modulating-board may be in a lower position or nearer to the keyboard than the rear edge of the modulating-board; but the spaces on the modulating-board should always be opposite to and correspond with the keys of the piano and a distance above the keyboard, in order that the piano-keys may be played upon without any obstruction. The black spaces 6 of this modulating-board may be made roughened or of different texture to contrast to the touch of the white spaces 8, so that the device may be of service to the blind.

The operation of the device is as follows: The teacher or the pupil may register a chord or chords of music by placing a number of pegs 10 in their proper holes 9 in certain spaces on the modulating-board to represent the piano-keys which are necessary to make up a chord or chords. The child sits at the piano with the modulating-board in position on the piano and before her and reads from the register of the modulating-board as many chords as are registered thereon and plays the keys of the piano which are opposite to and below the indicating-pegs. One row of pegs, each peg over a different key, always represent a chord or chords, as the case may be, according to the number of pegs registered.

The principal feature in my modulating-board is to teach modulating and does not represent a musical keyboard with a representation of a musical staff or staves above said keyboard and a series of holes in said staves to receive pegs, as in British Patent No. 379, of 1891, nor is my modulating-board a representation of a piano-keyboard and a representation of a musical staff above said keyboard, as in United States Patent No. 539,191, of 1895. Again, my modulating-board has no representation of a staff or staves notation on it, and whereas the British and United States patents referred to can only represent one key at a time my modulating-board having eight or ten sets of holes can represent all the necessary chords in playing cadences and in modulating from key to key. The patents referred to are not for the purpose of modulating and could not in any way facilitate the teaching of the same.

In teaching from my modulating-board the child is not confused by bringing in any staff notation; but the board is an exact representation of the keyboard and perpetuates, so to speak, every chord that has to be played without perpetuating it in a different way—that is, by the staff notation.

What I claim as my invention, and desire to secure by Letters Patent, is—

In a piano, the keyboard of a piano; a modulating-board arranged over the keyboard; transverse spaces on modulating-board, corresponding with and representing piano-keys; rows of holes in said spaces; piano-key indicators adapted to be placed in said holes, to represent the different chords, substantially as described and set forth.

EVELYN ASHTON FLETCHER-COPP.

Witnesses:
ALFRED E. COPP,
MARY A. ADAMS.